US011762114B2

(12) United States Patent
Nilsen et al.

(10) Patent No.: US 11,762,114 B2
(45) Date of Patent: Sep. 19, 2023

(54) METHOD FOR CONSTRUCTING A GEOLOGICAL MODEL

(71) Applicant: Roxar Software Solutions AS, Stavanger (NO)

(72) Inventors: Erik Nilsen, Oslo (NO); Håvard Bjerke, Sofiemyr (NO); Denes Matetelki, Oslo (NO); Wenxiu Yang, Oslo (NO); Randi Sundt Meyer, Hosle (NO)

(73) Assignee: ROXAR SOFTWARE SOLUTIONS AS, Stavanger (NO)

( * ) Notice: Subject to any disclaimer, the term of this patent is extended or adjusted under 35 U.S.C. 154(b) by 1100 days.

(21) Appl. No.: 16/098,770

(22) PCT Filed: May 16, 2017

(86) PCT No.: PCT/EP2017/061715
§ 371 (c)(1),
(2) Date: Nov. 2, 2018

(87) PCT Pub. No.: WO2017/198657
PCT Pub. Date: Nov. 23, 2017

(65) Prior Publication Data
US 2019/0120984 A1    Apr. 25, 2019

(30) Foreign Application Priority Data
May 18, 2016   (NO) .................................... 20160851

(51) Int. Cl.
*G01V 1/30* (2006.01)
*G01V 99/00* (2009.01)
*G01V 1/28* (2006.01)

(52) U.S. Cl.
CPC ................ *G01V 1/301* (2013.01); *G01V 1/28* (2013.01); *G01V 1/30* (2013.01); *G01V 99/005* (2013.01);
(Continued)

(58) Field of Classification Search
CPC . G01V 1/301; G01V 1/28; G01V 1/30; G01V 99/005; G01V 2210/643; G01V 2210/66
(Continued)

(56) References Cited

U.S. PATENT DOCUMENTS 5,675,551 A    10/1997   Sitoh
6,278,949 B1    8/2001   Alam
(Continued)

FOREIGN PATENT DOCUMENTS

| NO | 336002 B1 | 4/2015 |
|---|---|---|
| WO | WO-2007046107 A2 | 4/2007 |
| WO | WO-2015053756 A1 | 4/2015 |

OTHER PUBLICATIONS

Hale, Dave, and Jeff Emanuel. "Seismic interpretation using global image segmentation." SEG Technical Program Expanded Abstracts 2003. Society of Exploration Geophysicists, 2003. p. 1-4. (Year: 2003).*

(Continued)

*Primary Examiner* — John E Johansen
(74) *Attorney, Agent, or Firm* — PEARL COHEN ZEDEK LATZER BARATZ LLP

(57) ABSTRACT

The present invention relates to a method of providing a geologic model representing geologic features based on geologic measurement dataset constituted by a number of data points sampled in a chosen region. The method includes the following steps: a) receiving at least one user selected control point (1) representing a geological feature in the measurement data set, b) providing an initial guide surface (Continued)

Figure 1A:
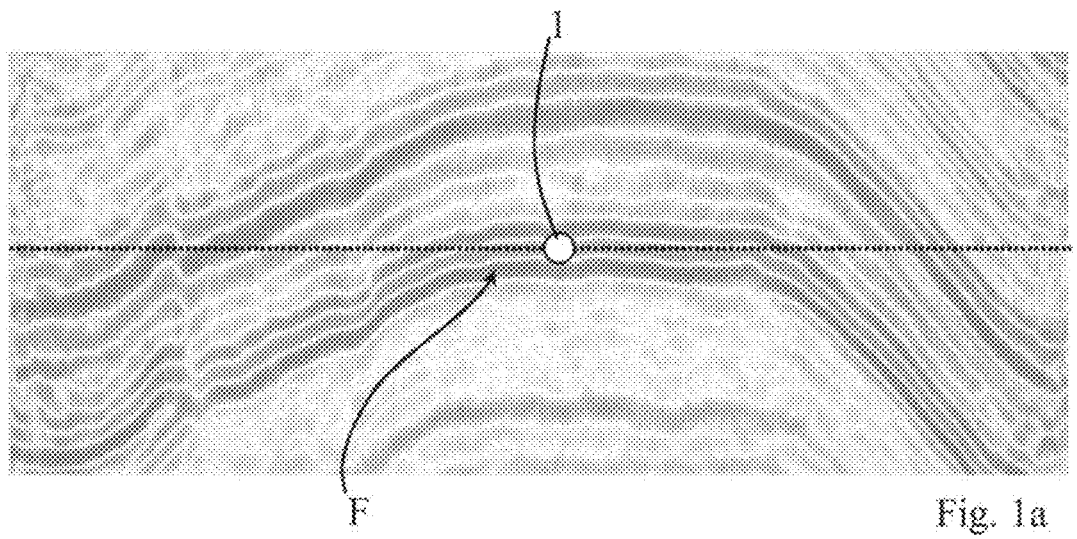

(2) with a predetermined shape, the control point (1) being positioned in said initial guide surface, c) comparing said initial guide surface shape with the sampled data points (4) for detecting measurement data points being similar to the measurement data of said control point (1), providing a vertical difference value representing the vertical difference between the depth of the guide surface and the depth of said corresponding data points for each compared data point in said set, d) from a selected set of said difference values, generating a new guide surface (5) corresponding to the control and data points.

12 Claims, 10 Drawing Sheets

(52) U.S. Cl.
CPC .... *G01V 2210/643* (2013.01); *G01V 2210/66* (2013.01)

(58) Field of Classification Search
USPC .......................................................... 703/6, 10
See application file for complete search history.

(56) References Cited

U.S. PATENT DOCUMENTS

| | | | |
|---|---|---|---|
| 8,265,876 B1* | 9/2012 | Yu .......................... | G01V 1/301 |
| | | | 702/16 |
| 2015/0081259 A1* | 3/2015 | Leahy .................. | G01V 99/005 |
| | | | 703/2 |
| 2015/0316683 A1* | 11/2015 | Purves ................. | G01V 99/005 |
| | | | 703/2 |

OTHER PUBLICATIONS

Rahman, Md Motiur, M. K. Rahman, and S. S. Rahman. "Control of hydraulic-fracturing-induced formation damage by optimizing treatments with constraints." International Symposium and Exhibition on Formation Damage Control. OnePetro, 2002. p. 1-11. (Year: 2002).*

Mirkovic, Olinka, "International Search Report," prepared for PCT/EP2017/061715, dated Jul. 19, 2017, four pages.

Coffeen, J.A., Seismic On Screen: An Introduction to Interactive Interpretation, PennWell Books, 1990, ISBN 0-87814-364-5, pp. 98-101.

* cited by examiner

METHOD FOR CONSTRUCTING A GEOLOGICAL MODEL

This invention relates to the field of subsurface mapping as commonly used in resource exploration, specifically interpretation of geophysical data. It falls within the class of interpretation tools typically known as auto-tracking technologies. Geophysical data typically includes data resulting from seismic or electromagnetic surveys.

BACKGROUND

Geologic interpretation is a time consuming and labor intensive task, but it is required in order to produce detailed descriptions of the subsurface for use in commercial decision making in hydrocarbon exploration and production, for instance. In particular, operators have varying requirements for the level of detail in their geologic interpretations, and need an efficient way to obtain this information. In typical subsurface mapping applications related to extractive industries or hazard assessment, seismic data is usually the data of choice; and much of the prior art refers to methods of seismic interpretation. However, interpretation workflows can also include interpretation of other geologic data used in the industry, for example, electromagnetic data, gravity data, etc.

In seismic data, each trace is an individual measurement of vertical impedance structure. According to the known art auto-tracking technology has been used to streamline the interpretation process by letting the computer guess which positions in a seismic image most closely resemble the interpreter's desired structure. This is accomplished by letting the interpreter place a seed point on an individual trace; adjacent traces are then compared to the seed trace to determine some metric of similarity. Then, the computer estimates which location on the adjacent trace most closely resembles the seed point. An elaborate discussion of the known solutions is provided in Norwegian patent No 336.002 and corresponding US patent application US2015/0081259.

A problem related to the known solutions is that the methods are time consuming and does not take into account the quality of the geological data. Because of this an unnecessary amount of processing is performed with good geological data. Thus there is a need for a flexible solution A limitation with the solution discussed in US2015/0081259 is the inability to easily capture dome shaped horizons in the seismic data. The purpose of using an iterative snapping implementation according to the present invention is to capture such shapes more easily.

In an article by Coffeen, J. A. "Seismic on Screen" PennWell Books, 1990, page 99-100, ISBN 0-87814-364-5, a system is discussed that is similar to the one in US2015/0081259 but searches for similar data within a time window corresponding to a distance above and below the depth of the previous point or seed point. Thus the search time in adjacent traces is limited, but by also increases the likelihood of not finding the best point in the new trace.

U.S. Pat. No. 8,265,876 also discuss a system starting at a seed point and searching sequentially through adjacent traces for tracking a geological feature.

The systems according to the known art provide an increasing uncertainty when working away from the seed point as the likelihood for following the wrong geological feate increases with the distance.

The current invention is aimed at solving this problem by providing an estimated horizon shape for a chosen area especially suitable for relatively predictable shapes, such as dome shapes, for providing an initial model estimate of a geological feature. This is performed as described in the accompanying claims.

The present invention is thus based on a method starting with one or more control points based on known features in the geological formation. A guide surface is defined incorporating the known control points. With one or two control points the guide surface may be a plane, while more control points could define a more complex shape such as a dome. The guide surface covers a selected horizontal area including a number of traces or other geological data representing positions in the horizontal plane in the 3D space. The data may be sampled from positions being distributed more or less evenly over the horizontal area. Difference values are then found between the guide area and a selected number of positions in the horizontal area, and a new guide surface may be calculated from the differences between the depth of the features and the depth of the corresponding position in the guide surface.

This process may be repeated as an iteration for a number of steps and after converging the area is either abandoned or results in a guide surface indicating the shape of a chosen horizon.

In the preferred embodiment of the present invention points belonging to a horizon are found along a signal roughly matching the one found in the seismic trace around the seed point. A search window is used to establish two surfaces above and below the seed points within which to search for matching data points in the seismic traces. These surfaces are fitted to the respective upper and lower bounds of the seed points' search windows, using a surface fitting algorithm.

The invention will be described below with reference to the accompanying drawings, illustrating the invention by way of examples.

FIG. 1a-h illustrates the process of selecting control points and modelled areas.

FIG. 2a-e illustrates schematically the method according to the invention in case of a fault in the horizon.

Figure 3A:
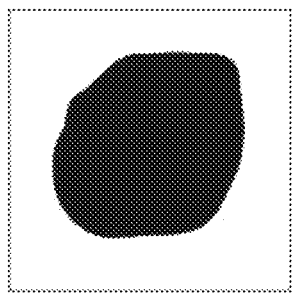
Figure 3B:
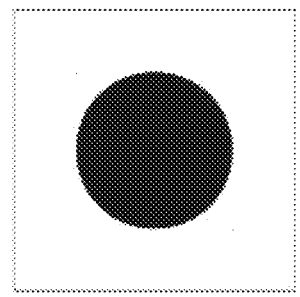
Figure 3C:
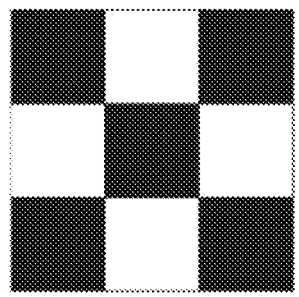

FIG. 3a-c illustrates the propagation or patterns for mapping an area as seen from above.

FIG. 4a-f is an alternative illustration of the method according to the invention.

The present process may be described as generating a model of geological features using at least one data point representing a control point, and a smooth model representing a geometric surface of the geological model representing an initial guide surface. Based on this more guide points may be computed. The initial guide surface is preferably calculated using an algorithm such as a B-spline method or similar designed to generate reasonable geological surfaces, to generate the initial guide surface from a set of control points.

Figure 1B:
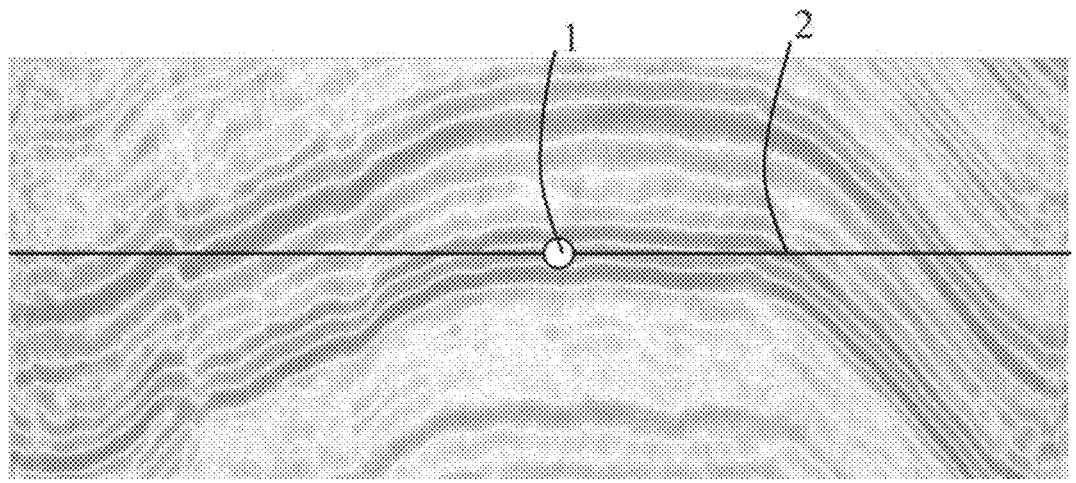

In FIG. 1a the cross section of an illustrated geological feature F is shown where a control point 1 has been selected. Through the control point an initial guide surface has been computed, and as there are no other knowledge of the feature the initial guide surface describes a plane. The control point may be represented by a trace expected to have good reliability or other sampled geological data such as a bore hole. Through this a propagation plane 2 is calculated as illustrated in FIG. 1b.

Figure 1C:
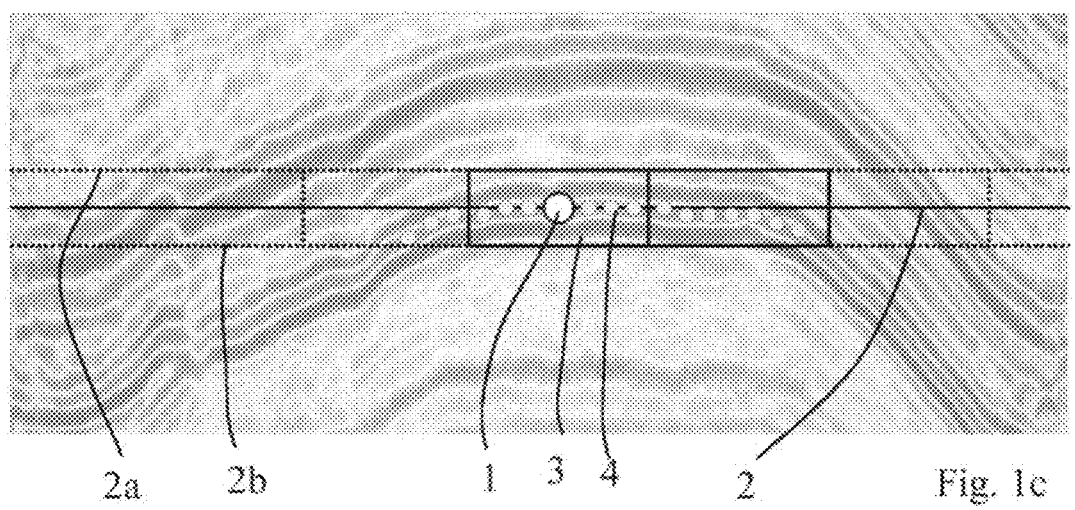

In FIG. 1c an upper 2a and a lower 2b limit is defined above and below the propagation plane 2 defining a volume 3, illustrated as a block, the shape of which may be chosen depending on the situation and data set as well as the known shape of the feature that is investigated.

An upper search limit 2a is defined by a surface with shape identical to the propagation surface but shifted vertically upwards. A lower search limit 2b is defined likewise by shifting the surface downwards. Guide points matching the control point(s) are only searched for within the volume existing between the surfaces defined by the upper and lower search limits 2a,2b.

Figure 1D:
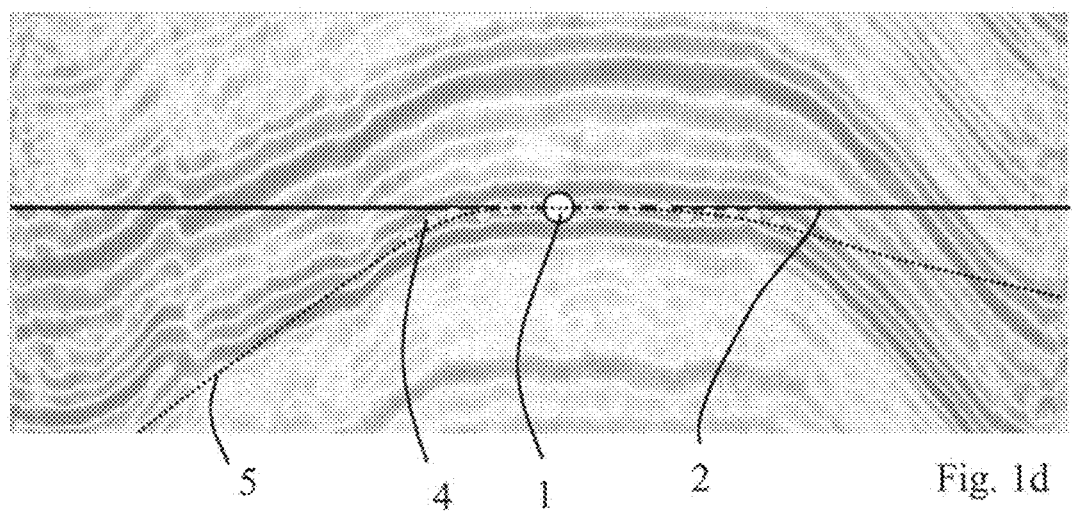
Figure 1E:
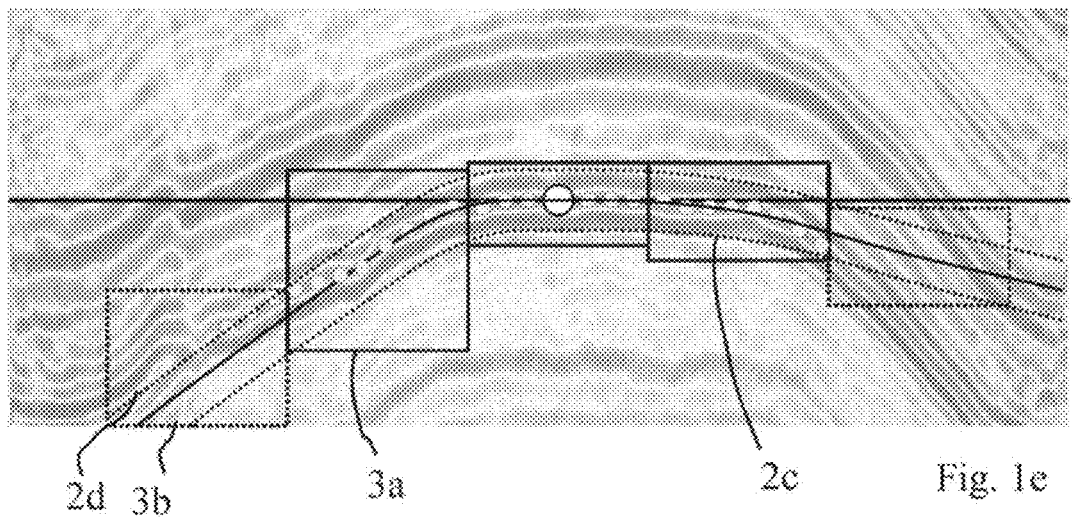
Figure 1F:
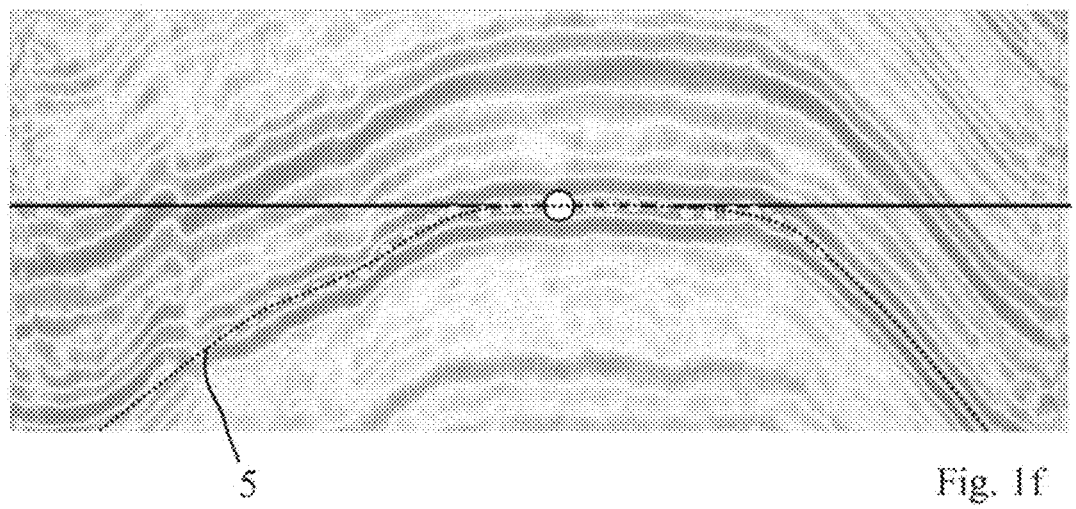
Figure 1G:
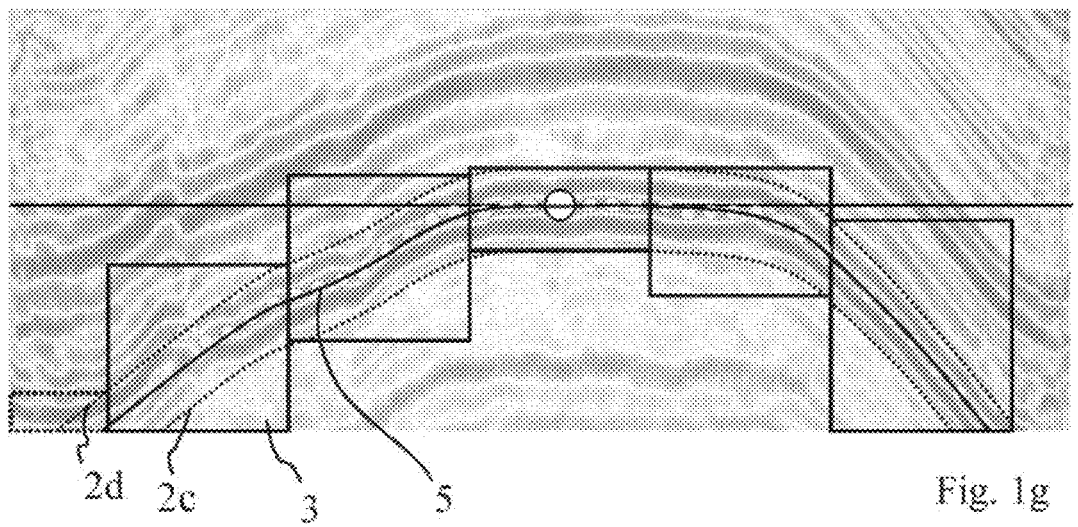
Figure 1H:
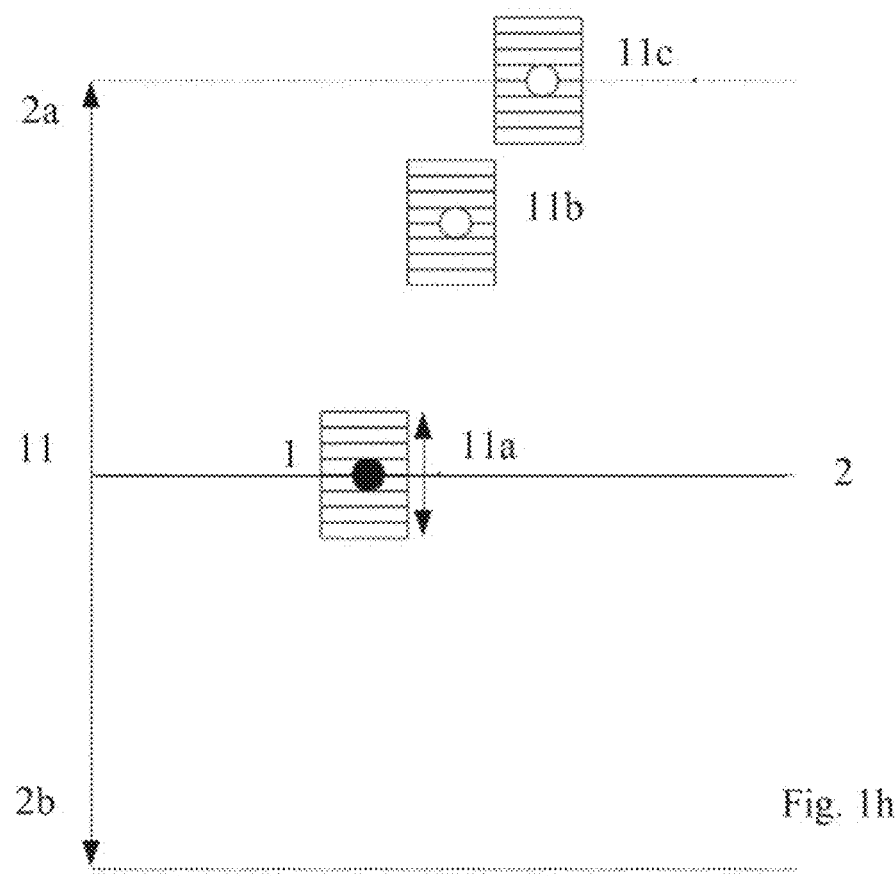

This is illustrated in detail in FIG. 1h where the search window 11 between the upper and lower limits 2a,2b. In this example we define the vertical limits of the search window in seconds. They form the bounds vertically to search for guide points, thus referring to time windows. A data sample window 11a representing the control point is compared with sample windows 11b,11c representing data points within the window 11 above and below the guide surface 2. The sample windows are sufficiently large to describe a recognizable feature.

The sample window is defined in number of samples and decides the number of samples used when comparing control point traces with guide point traces.

Data may, however, be sampled outside the search limits. For example, when searching near the upper or lower edge of the volume, parts of a seismic trace may extend beyond the limits and are included in the comparison between the control point(s) and the guide point. A fixed range (number of samples) is used to define the range of samples used when comparing between control and guide points.

For example, we may choose a sample range of 16 samples. At a certain lateral position we may compare 16 samples from a control point with 16 samples around a guide point. If the guide point's vertical position is at the very edge of the vertical search limit, then 8 samples will extend beyond the vertical search limit.

Moreover, data sampling may also extend beyond the search limits in order to improve sampling speed. For example, sampling a regular volume may be more efficient than an arbitrary shape. Thus in our example data is sampled in block-wise volumes that span the maximum upper and lower search limits given by the horizontal extent of the blocks plus the extent of half the sample range above and below the search limits.

Within the initial block in FIG. 1c, for a number of horizontal positions 4 represented by traces or other types of data, a search is made for a feature similar to a certain degree to the characteristics in the control point and, if a corresponding point is found the depth difference between the propagation surface and the depth of the new data point is found. As discussed above the upper and lower limits or search ranges 2a,2b define initial limits for the search in the vertical direction and may be chosen or adjusted manually or by the algorithm depending on the expected characteristics of the geological feature.

An iteration surface is the sum of the guiding surface 2 and a difference surface 5 as illustrated in FIG. 1d. The difference surface is fitted to the offsets of the most confident fitted points 4 from the guiding surface 2. This means that we choose to discard matching data points with a low similarity to the seed point, when establishing the difference surface. The remaining traces are then used to calculate the vertical offset of the matching point to the guiding surface 2.

In the first iteration the initial difference surface is zero, and the iteration surface is equal to the guiding surface 2. Effectively, an iteration surface equal to the guiding surface is used to generate an initial set of fitted points. These fitted points are then used to generate the new guide surface 5 for the next iteration. In this iteration the traces are fitted again using the search window as illustrated in FIG. 1|e with new upper and lower limits to the search for each trace or in defined search volumes 3a and weighting dictated by the refined iterated guide surface 5. These fitted points are then used again in the next iteration possibly with new volumes 3b, and so on as shown in figures if and 1 g. As a result of the iteration process a confidence for the guide surface 5 between an upper 2d and lower 2c depth may be obtained.

In addition to this, the new guide surface may be used to give a higher weight to signals that are closer to the surface. This means that signals are less likely to be captured as they extend towards the boundaries of the search window.

In order to capture such signals, the user may add more control points, with varying search ranges 2a,2b, in order to control the signal to compare against and the shape of the surfaces that form the boundaries of the search window, as well as the guiding surface.

Thus the algorithm according to the invention uses an iterative surface in place of a guiding surface. This means that it is used to control the vertical boundaries and weighting of the seismic trace fitting. In this respect it has the same function. The distinction, however, is that the iteration surface is generated automatically based on the seismic data and the guiding surface, while the guiding surface is generated by manual user input.

Moreover, the guide surface may be a surface fit of all control points belonging to an interpreted horizon; or, in the case of a faulted model, it is a set of patches bounded by the fault blocks and similarly fitted by control points.

Mostly for performance reasons it is advantageous to limit the extent of the search for matching data points, as searching for matches is computing-intensive. The likelihood of finding matches with a naïve initial guiding surface decreases with distance from the control point, thus it is unnecessary to perform a search beyond some extent from a control point until a new guide surface that represents the seismic data well, has been established for that area.

If a valid vertical difference value is not found for a certain data point or measurement point this may be ignored. The rejected points may be tried again in view of the new guiding surface being based on the alternative traces.

Initially, in the embodiment illustrated in FIGS. 1a-f only the nearest neighborhood of the control point is searched and used to compute the initial propagation surface extending outside the neighboring area. The propagation surface extrapolates beyond the initial search to form the vertical bounds for the next iteration, and so on.

Horizontally, the extent of the search is dictated by the confidences of the fitted points in the previous iteration. We start initially in a selected area surrounding the control point and fit the traces positioned in that area. We then calculate the average fit confidence, c, of the current area, and if it is higher than a certain threshold, t, then we expand into the neighboring areas. If they again have higher average confidence than the threshold, then we explore unexplored neighbouring areas, and so on. When there are no more areas within the seismic data to process, then the iteration is finished, and the next iteration in a new area is started. The next iteration repeats the process of exploring outwards from the control point.

A more refined propagation surface is likely to result from one iteration to the next. Thus we are likely to find more well defined areas from one iteration to the next, as the propagation surface extrapolates into the unexplored areas. The entire fitting process ends when, after a number of stabilizing iterations, no new well defined areas are found.

More specific the number of iterations needed to find guide points that match the seismic feature well, depends on several parameters, including the search limits, the position(s) of the control point(s), and the seismic data. The algorithm does not calculate the number of iterations beforehand, but instead terminates after subsequent iterations do not yield significantly better results.

The quality of the result is estimated from the number of found guide points and their confidence. Usually, in the first few iterations, more guide points with higher confidence will be found from one iteration to the next, as the guide surface gradually adjusts to the seismic feature. After a few iterations, usually a plateau is reached, and the next iteration does not yield a significant increase in number of confident guide points. After a few stabilizing iterations, if the quality of the result does not increase again, then the algorithm is terminated, yielding the final guide points and the updated guide surface as the result of the algorithm.

If a valid propagation or difference surface has been obtained for the area a new selected area may be chosen, preferably positioned in the continuation of the calculated iteration surface. The shape of the iteration surface may be found within a laterally separate area. This area may be adjacent to the previous area or separated by a certain distance.

Searching at a different depth, while looking into a different horizontal position, may enable the system to find the formation again even if it was shifted, for example by a fault line or other distortions in the horizon.

Figure 2A:
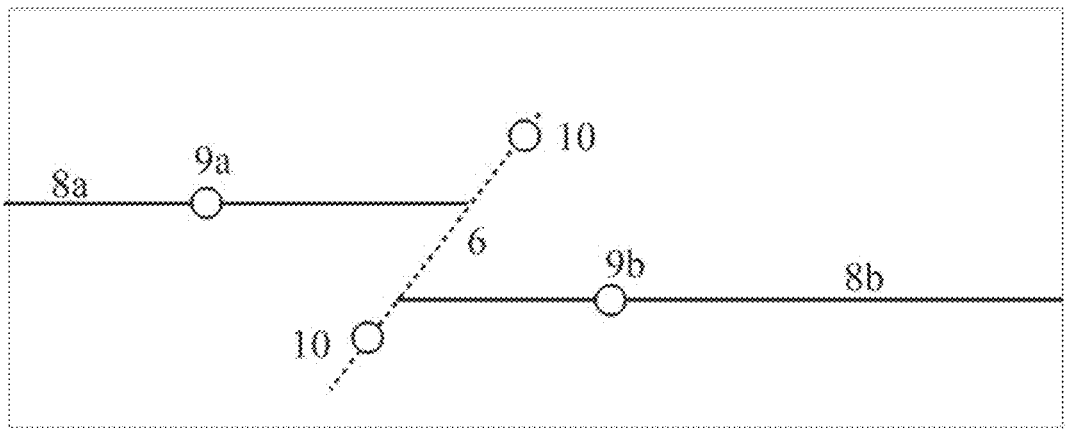
Figure 2B:
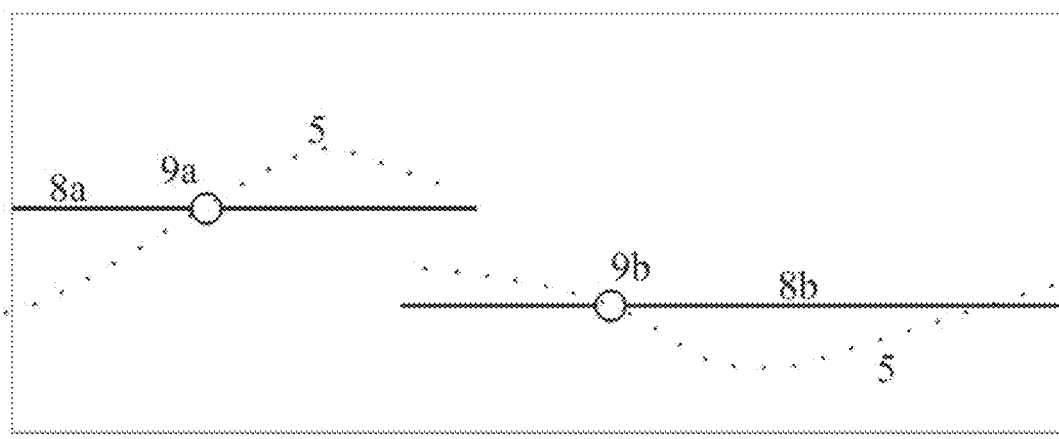
Figure 2C:
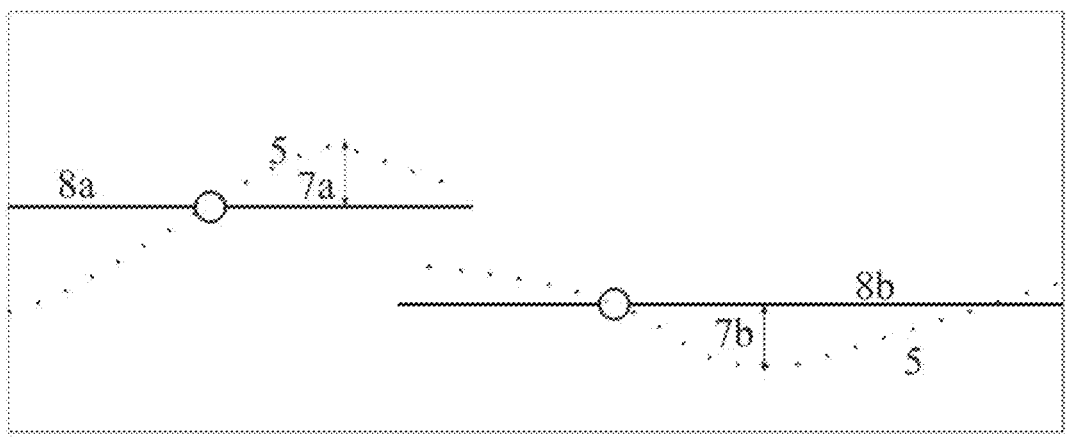
Figure 2D:
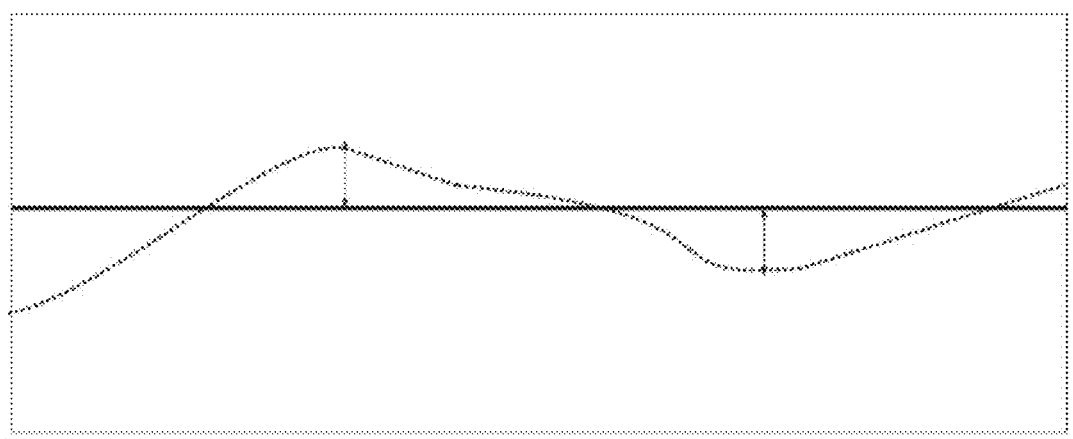
Figure 2E:
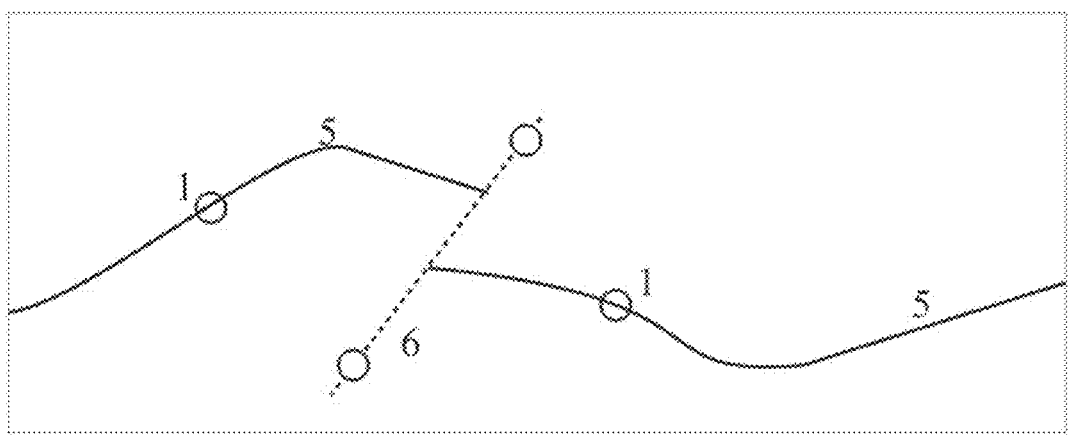

FIGS. 2a-e shows an alternative illustration of the process including a fault line 6 in the geological formation where the guide surface 8a,8b takes into account the known fault. This is done in this case by using two control points 9a,9b representing the known feature shifted in the vertical direction and where the guide surface is discontinuous at the fault position 6. As is illustrated in FIG. 2c the difference values 7a,7b is found between the guide surface 8 and the fitting geological values. As can be seen in FIG. 2d the difference surface as such may be considered to be continuous for calculation purposes, while the propagation surface in the resulting model 5 in FIG. 2e has taken into account the fault. Similar methods may also be used in other situations where the geological structures have known characteristics that could affect the calculation of the model of the structure.

FIGS. 3a-c illustrate the process as seen from above, i.e. in the horizontal plane, illustrating the shape and distribution of the selected areas. In FIG. 3a the area is defined by, for example, the set of trace signals matching the seed signal with a confidence above a certain threshold. In FIG. 3b the selected area is defined by the distance from the first control point, and in FIG. 3c a mask pattern is used consisting of a patterns of regular blocks.

In the system illustrated in FIG. 3c, the mask pattern may be shifted and changed. Alternatively a fractal pattern may be used to mask selected traces. After calculating the new area the area that did not result in a good fit in an earlier iteration may be revisited based on the new model improved by a further iteration in which the previously masked area could result in a good fit.

More in detail the guide surface may be calculated as described above by the steps of:

1. Using a guide surface representing a geological feature including one or more control points, as illustrated in FIG. 2a-b.

2. The guide surface is then matched with the measured traces near the guide surface, and the vertical offset is calculated giving the best signal match to the guide surface, as described above.

3. The measured traces and criteria may be chosen for every iteration, thus e.g. trying different data types or selected areas illustrated in FIG. 3a-c. The set of selected traces meeting the intersection of these example criteria can be described as $$S = C \cap D \cap M$$

Where C is the set of all traces with confidence higher than a certain confidence threshold, D is the set of all traces with a distance from the nearest control point lower than a certain distance threshold, and M is the set of traces not masked by the mask pattern.

Thus an example selection predicate function S, for trace, t, can be described as $$S(t) = C(t) \cdot D(t) \cdot M(t)$$

4. The signal match offsets from the selected traces may be used to generate a new surface by interpolating or extrapolating over any rejected, non-converging, traces.

5. The process is repeated by matching the traces to the new surface, as described in point 2, until a convergence criteria is met.

FIGS. 4a-e illustrates an example of a specific implementation of the invention 1. Starting in FIG. 4a with a B-spline algorithm used to generate an initial guide surface 2 from a set of control points 1, the geologic feature also including a fault line 6.

Figure 4A:
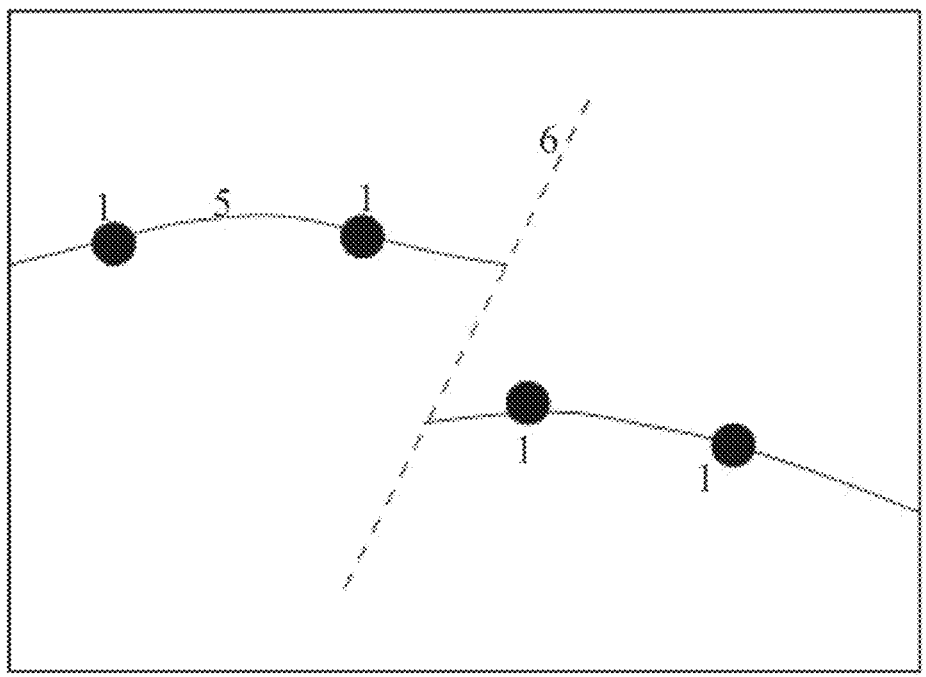
Figure 4B:
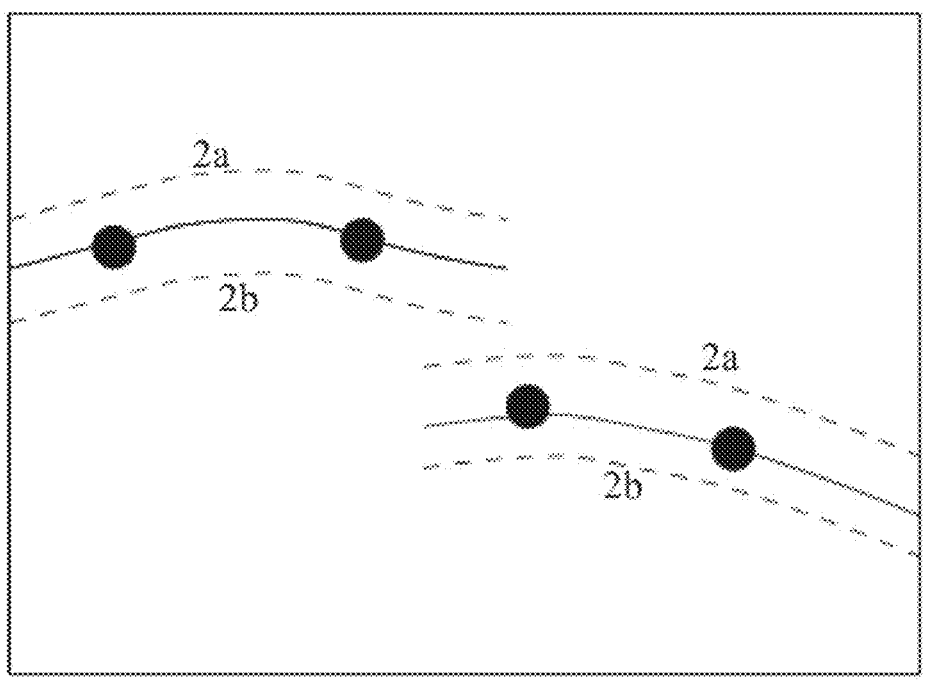

2. In FIG. 4b the signals in the traces nearest to the control points are used as reference signals. Matching signals are searched for within the search window between 2a and 2b around the guide surface. As mentioned above the search window may be specified user input and may vary between the iterations.

Figure 4C:
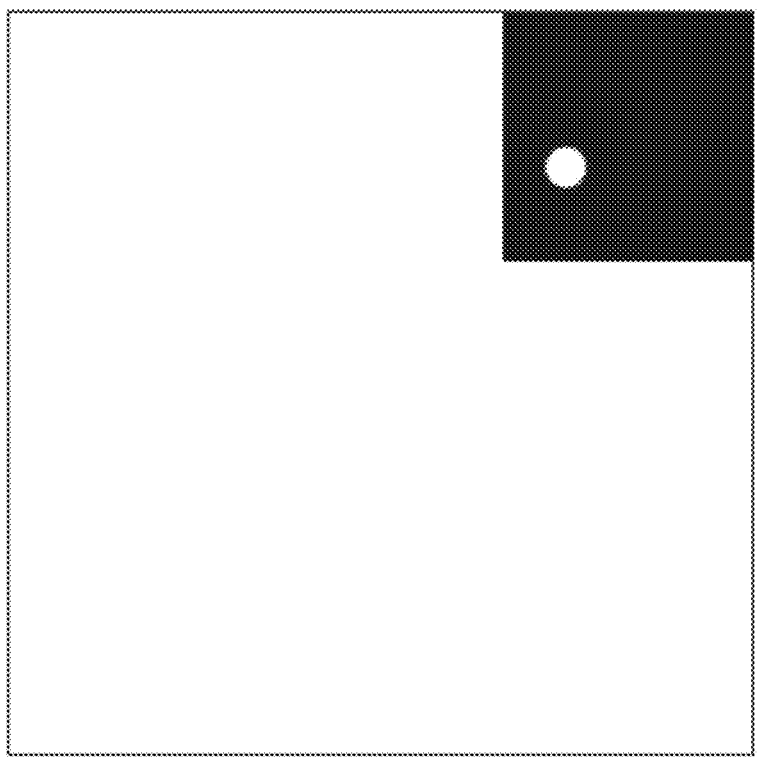
Figure 4D:
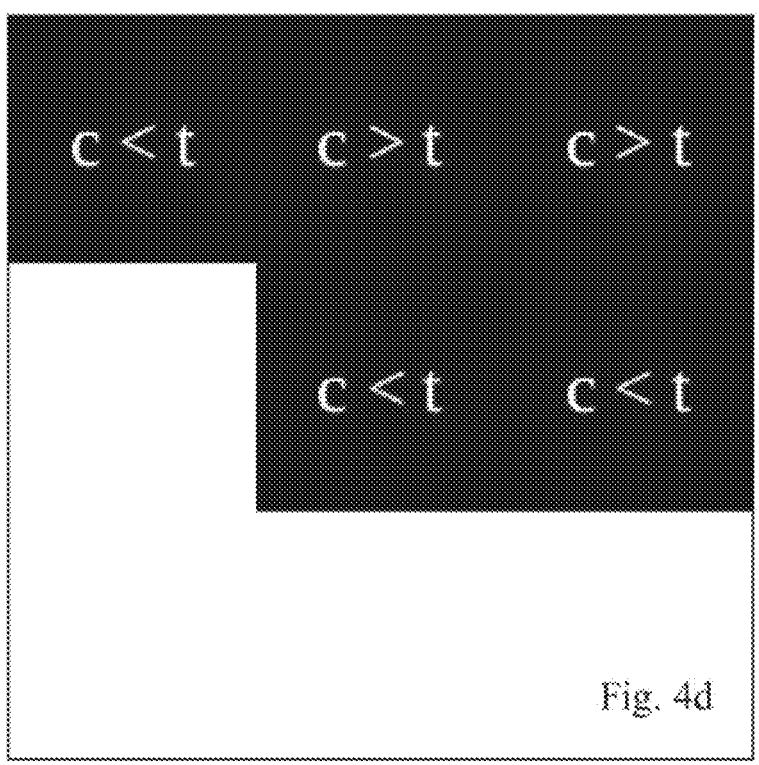
Figure 4E:
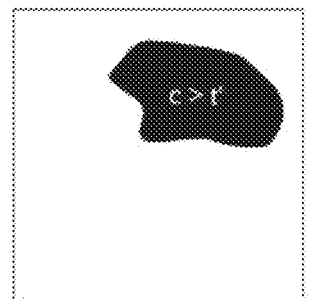

3. A combination of criterias may be used to select the traces. As an optimization the traces may for example be qualified blockwise. A confidence value is calculated based on the highest similarity of the three nearest control point signals and the offset from the guide surface. Referring to FIGS. 4c-e illustrating the geological area from above the following criteria may be used:

All blocks containing a control point may be selected, as illustrated in FIG. 4c.

Any blocks whose path of adjacent selected blocks to any control point contains only blocks having a lower average confidence, c, then a certain threshold, t,t are rejected, as illustrated in FIG. 4d. This is an optimization, as it is will not be necessary to calculate the confidence in these rejected blocks.

A fractal pattern, which varies in a random or planned manner between the iterations, is used to mask the selected traces. This is also an optimization as the confidence of the masked traces are not calculated.

Finally, as illustrated in FIG. 4e, all the traces with a confidence below a calculated threshold are rejected.

4. The selected traces contribute to a B-spline algorithm, which generates a new surface.

Figure 4F:
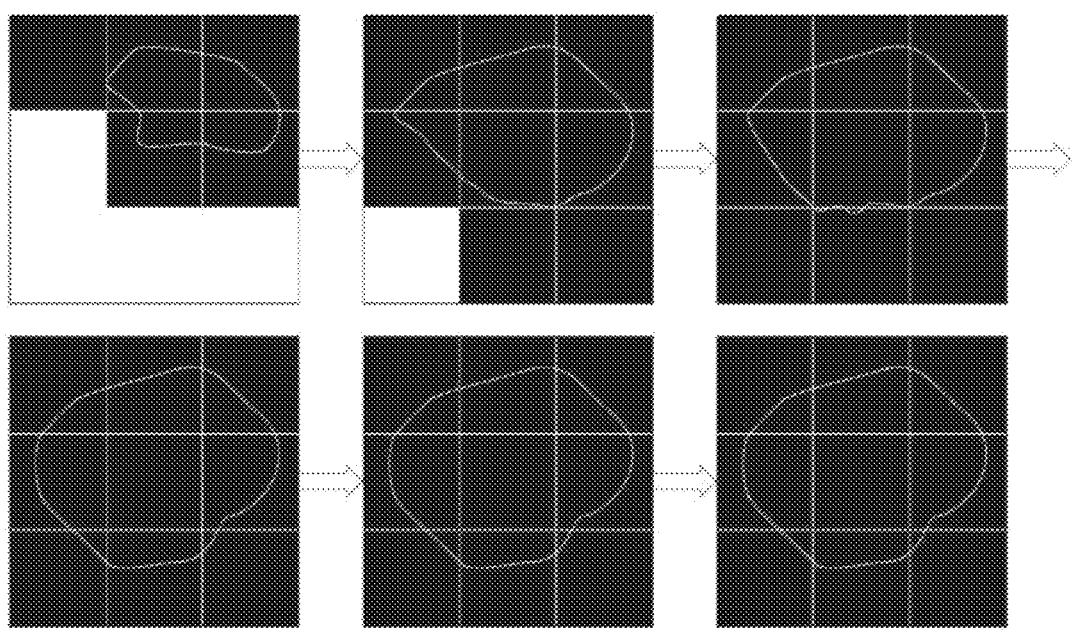

5. The convergence criterium is met when no two blocks with an average above the threshold may be selected in the last n iterations. FIG. 4f illustrates the iteration as the specific formation is mapped.

To summarize the invention thus relates to a method of providing a geologic model representing a geologic features based on geologic measurement data set constituted by a number of data points sampled in a chosen region. The seismic data will typically include seismic traces within known lateral horizontal positions, but may also include control points with more reliable data, such as information acquired from bore holes.

According to the invention at least one user selected control point is received, representing a geological feature in the measurement data set. These control points may be based on a trace of assumed good quality.

From the control points a guide surface is fitted having a predetermined shape fitting to the initial control points. If only one control point is selected the initial guide surface is a plane.

The guide surface thus indicates a geological surface fitting to the initial data and by comparing said initial guide surface shape constituting a model of the geological feature with the sampled data points corresponding to the information constituting the basis for the control point and thus representing the measured feature. The method thus comprising detection of measurement data points being similar to the measurement data of said control point and providing a vertical difference value representing the vertical difference between the depth of the guide surface and the depth of said corresponding data points for each compared data point in said set.

From a selected set of difference values a new guide surface corresponding to the control and data points may be generated.

As discussed not all of the measured data points may be used. Different lateral positions may be used according to a number of different rules or patterns. Also, some of the measured data points may not provide sufficient information to find a value corresponding to the generated or initial guide surface, and may then be masked and not taken into consideration when generating a new guide surface. This may be based on the calculation of a confidence value for the data in the trace.

In a following iteration the masked points may be tested again against the new guide surface, in case the new guide surface corresponds better to the measured data in that trace.

Thus the selected set of difference values may be selected based on the evaluated confidence of the vertical difference values and being selected when said confidence is above a chosen threshold, and/or laterally separated difference values, The set of difference values may be selected based on their lateral positions within said region of measurement points, randomly within the region and/or according to a chosen masking pattern within said region.

Another possibility is to increase the area of the guide surface gradually by selecting lateral positions depending on the nearest control point, verified point in a guide surface, the nearest control point and/or close to a point having high confidence value.

The invention claimed is:

1. A method of providing a geologic model representing geologic features based on geologic measurement data set constituted by a number of data points sampled in a chosen region, the method comprising:

a) receiving, by a computer, at least one user selected control point representing a geological feature in the measurement data set, wherein bore hole data that is physically acquired is used to obtain the control point;
b) providing, by the computer, an initial guide surface with a predetermined shape, the control point being positioned in the initial guide surface;
c) defining, by the computer, a volume between an upper limit above the initial guide surface and a lower limit below the initial guide surface, wherein the upper limit and the lower limit have the shape of the initial guide surface;
d) determining, by the computer, within the volume, the sampled data that has a similarity to the measurement data of the control point above a predetermined threshold;
e) determining, by the computer, a vertical difference between the depth of the initial guide surface and each of the sampled data above the predetermined threshold
f) generating, by the computing device, a new guide surface within the volume based on the sampled data above the threshold and its corresponding vertical difference; and
g) setting, by the computing device, the upper limit and the lower limit to new values based on the shape such that a new volume is created; and
h) iteratively repeating steps a) through g) until the new guide surface minimally changes.

2. The method according to claim 1, wherein the setting the upper limit and the lower limit is based on an evaluated confidence of the vertical difference and being selected when the confidence is above a chosen threshold.

3. The method according to claim 2, wherein the setting is further based on the confidence of other laterally separated difference values.

4. The method according to claim 1, wherein the setting the upper limit and the lower limit is based on their lateral positions within the region of measurement points.

5. The method according to claim 4, wherein the lateral positions are selected randomly or pseudo-randomly within the region.

6. The method according to claim 4, wherein the lateral positions are selected according to a chosen masking pattern within the region.

7. The method according to claim 4, wherein the lateral positions are selected depending on proximity to the nearest control point.

8. The method according to claim 4, wherein the lateral positions are selected depending on the proximity to the generated guide surface.

9. The method according to claim 1, wherein the initial guide surface shape defines a plane.

10. The method according to claim 1, wherein the initial guide surface defines curved shape.

11. The method according to claim 1, wherein the extrapolation of the guide surfaces comprises known discontinuities in the data.

12. The method according to claim 11, wherein the known discontinuities in the data comprise geological faults.

* * * * *